June 14, 1960     HIDEYA KOBAYASHI     2,940,369
CAMERA WITH REFLECTION LIGHT METER
Filed July 30, 1957     4 Sheets-Sheet 1
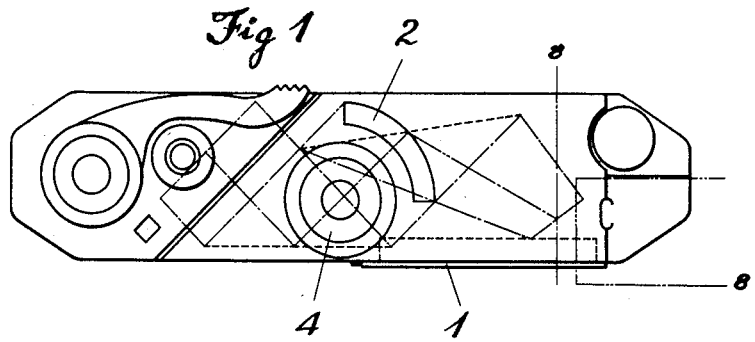
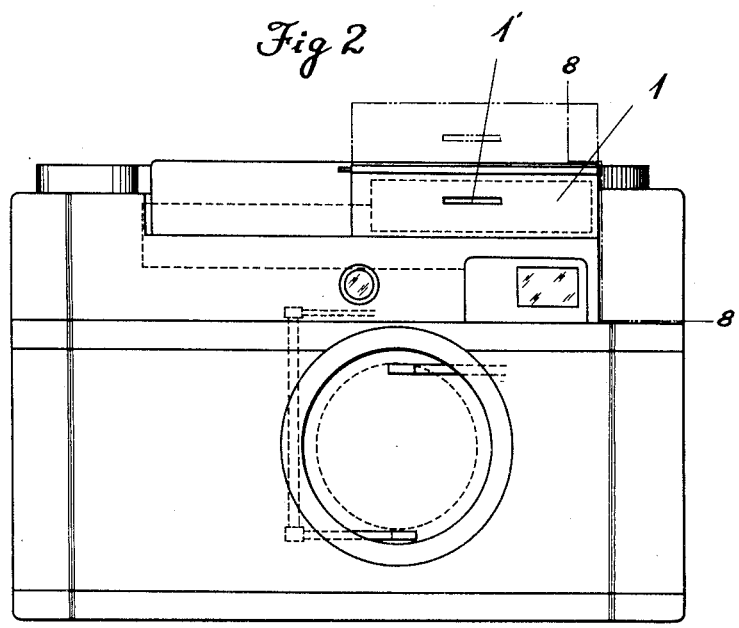
*INVENTOR.*
HIDEYA KOBAYASHI
BY
*Leon M. Strauss*

June 14, 1960  HIDEYA KOBAYASHI  2,940,369
CAMERA WITH REFLECTION LIGHT METER
Filed July 30, 1957  4 Sheets-Sheet 3

INVENTOR.
HIDEYA KOBAYASHI

June 14, 1960  HIDEYA KOBAYASHI  2,940,369
CAMERA WITH REFLECTION LIGHT METER
Filed July 30, 1957  4 Sheets-Sheet 4

INVENTOR.
HIDEYA KOBAYASHI
BY

United States Patent Office 2,940,369
Patented June 14, 1960

2,940,369

CAMERA WITH REFLECTION LIGHT METER

Hideya Kobayashi, 27, 1-Chome, Nagasakicho, Tokyo, Japan

Filed July 30, 1957, Ser. No. 675,069

Claims priority, application Japan Aug. 7, 1956

2 Claims. (Cl. 95—10)

This invention relates to an operatively connected correcting device for a camera made to determine the correct exposure by making the image of the needle pointer of the exposure meter built in the camera coincide with the standard mark within the field of vision of the view finder through reflecting mirrors movable corresponding respectively to the exposure time and the opening of the diaphragm, wherein a rotatable prism mirror is located between the needle pointer of said exposure meter and the movable mirrors, the mirror surfaces of said prism mirror have respectively different inclinations to its rotating axis and said axis of the prism mirror is to be rotated corresponding to the opening or closing of a cover for restricting the amount of light received by the exposure meter or to the increase or decrease of the effect of a booster so that the effective reflecting surfaces of said prism mirror may be automatically changed.

First of all, the formation and function of an embodiment of a camera which is operatively connected with an exposure meter and to which said correcting device of the present invention is to be applied shall be explained with reference to Figs. 1 to 5 and then the object, function and effect of the correcting device of the present invention shall be detailed.

Figure 1 of the drawings is a plan view of the camera operatively connected with an electrical exposure meter.

Figure 2 is a front side view of Figure 1.

Figure 3:
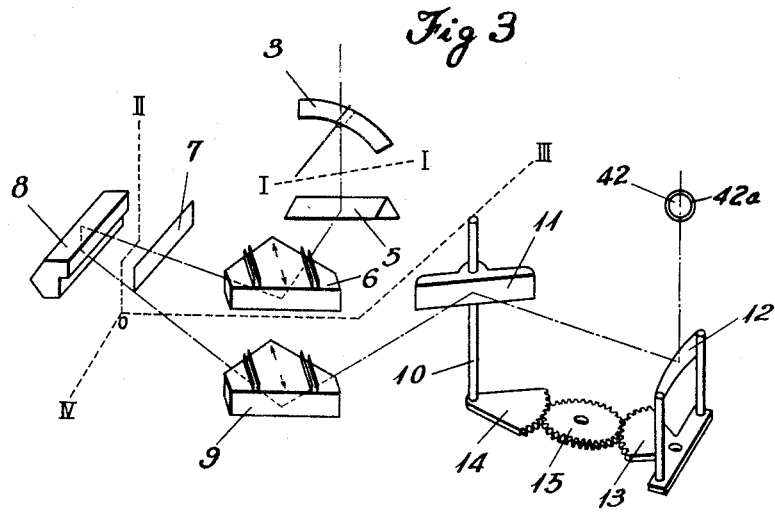
Figure 3 is a skeleton drawing showing the path of light to explain the function of the camera shown in Figure 1.

An electrical exposure meter (not illustrated) is built in the upper cover of the camera shown in Figures 1 and 2, the light receiving window of said exposure meter being opened in the front surface of the camera. A lid 1 is hinged to said opening. A slit 1' is made in said lid so that light may be received through said slit with the lid closed in case the brightness of the object is high. This is the same as in any conventional camera. An arcuate window 2 which projects external light onto the needle pointer of the exposure meter is made in the top surface of the cover of said camera with its imaginary neutral line inclined by about 45 degrees to the front and rear surfaces of the camera. A diffusive translucent plate 3 is provided below said arcuate window. Said plate is positioned between the forked ends of the needle pointer of the exposure meter and said needle pointer is so made as to be able to swing free from the plate.

Below said translucent plate 3, a narrow long prism mirror 5 with the reflecting surface inclined by 45 degrees to the top plate of the camera is fitted with its longitudinal direction inclined by 45 degrees to the front and rear surfaces of the camera. Therefore, the light going directly downward through the arcuate window will be reflected by the surface of the mirror 5 and will progress horizontally in the direction inclined by 45 degrees to the front wall of the camera. However, in the path of said light is placed the first slidable reflecting mirror or reflecting prism 6, and by its reflecting surface the light will be made to progress in the direction inclined by 45 degrees to the rear wall surface of the camera.

This light will pass through a later mentioned window 7 or a transparent glass plate fitted in said window, and is reflected from a roof-shaped reflecting mirror or prism 8 located behind said window, and descends by one step and reversely progresses horizontally in the original direction. The light which has thus reversely progressed will be reflected by the reflecting surface of the second slidable reflecting mirror or prism 9 provided below the first slidable reflecting mirror 6 and progress horizontally in the direction inclined by 45 degrees to the rear wall of the camera. This light will be reflected at equal angles by the vertical reflecting surface of a mirror 11 which can swing integrally with a rotatable vertical shaft 10, will be further reflected as can be seen in Fig. 3 by an outwardly curved movable reflecting mirrow 12 and will reach the eyepiece 42 of a finder. The sector gear 13 on the frame 37 supporting said movable reflecting mirror 12 and the sector gear 14 on said shaft 10 are geared with each other through a pinion 15. Therefore, the image of the needle pointer of the exposure meter due to the light projected in through the arcuate window 2 will progress also along the above mentioned light path and will reach the eyepiece 47 of the finder.

A proper fixed mark 42a to be the neutral line of the field of vision is so made as to be seen within the finder.

Figure 4:
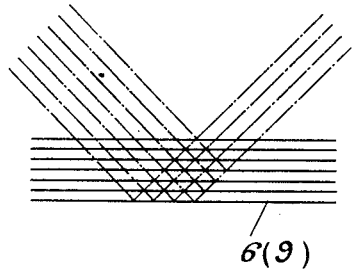
Figure 4 shows the state of the light reflected by the reflecting mirror in the light path in Figure 3.
Figure 5:
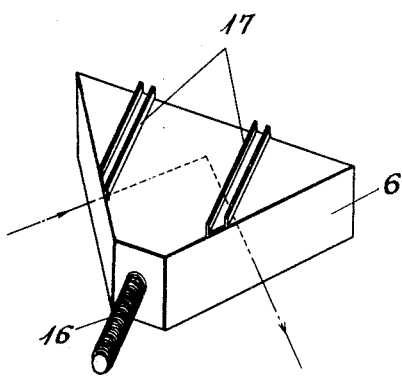
Figure 5 is a magnified view of a reflecting prism in Figure 3.

The first slidable reflecting mirror 6 of the above mentioned movable reflecting mirrors is operatively connected with the rotation of the ASA scale dial provided on the top cover of the camera and is made slidable forward and rearward along guide rails 17 fixed in the direction vertical to the reflecting surface of the mirror 6 by means of a screw rod 16 as shown in Figure 5. The second slidable reflecting mirror 9 is of the same construction as of the first slidable reflecting mirror and is made slidable in the forward and rearward direction in operative connection with the exposure time adjusting device of the shutter. In Figure 4, the displacement of these slidable reflecting mirrors is represented by the horizontal parallel solid lines and the change of the direction of the reflected light is represented by the dotted lines.

The optical elements constituting the essential parts of the above mentioned system are arranged in three stages in the cover in the top part of the camera. That is to say, the elements above the imaginary dotted line I—I in Figure 3 are installed in the top stage, those above II—O—III in the middle stage and those below III—O—IV in the bottom stage. Further in this cover, as shown in Figure 1, the compartment through which the upper part of the film winding shaft passes and the compartment to contain the essential parts of the present invention are detachably constructed, the roof-shaped reflecting mirror 8 shown in Figure 3 is fixed in the former compartment and the above mentioned window 7 is provided in the wall between both compartments. Thus it will be easy to build precisely the optical system constituting the essential parts of the present invention or to replace the photo-cell.

Now, if the above mentioned camera is charged with a film and the ASA scale dial on the top surface of the cover is rotated in accordance with the sensitivity of the film, the position of the first slidable reflecting mirror 6 operatively connected with the dial will be determined. When the photo-cell is subjected to the reflected light of an object to be photographed, the needle pointer of the exposure meter will indicate a certain position. Therefore, the direction in which the image of this needle pointer is reflected by the mirror 5 and is further projected in toward the second slidable reflecting mirror 9 can be determined by the resultant of the two factors of the light value of the object and the sensitivity of the film.

If the light value of said two factors is represented by L, as already known, L will have the following relation between the shutter time T and the A value of the diaphragm:

$$L = K \cdot \frac{A^2}{T}$$

wherein K is the sensitivity rating of the sensitive material.

Therefore, if the camera is so designed that, after either of the second slidable mirror 9 operatively connected with the exposure time adjusting device or the rotatable mirror 11 operatively connected with the diaphragm, for example, the slidable mirror 9 is set in accordance with the value of a required exposure time, when the other mirror 11 is moved and the image of the needle pointer of the exposure meter appearing in the finder is made to coincide with the fixed standard mark in the same finder, the diaphragm operatively connected with said latter mirror 11 may have a value to satisfy the above formula. After the camera is charged with a sensitive material having any sensitivity rating and either of the aperture or the exposure time is set at a required value, when the above mentioned operation is carried out, the other exposure factor can be automatically correctly set under the condition of obtaining the proper exposure. Therefore, at this time, the shutter may be released.

The aperture scale for the photographing lens used in the camera of the present invention should be of an equally divided one. However, if a member coming in and out in the direction of the optical axis in accordance with the degree of the aperture is provided in the lens holding cylinder of each spare lens, there will be a convenience that, even when any spare lens is fitted, after either of the aperture and the exposure time is predetermined at a required value, the correct amount of exposure can be easily determined.

Figure 6:
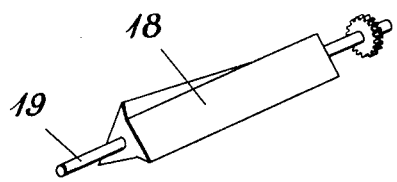
Figure 6 is a magnified perspective view of an embodiment of the rotatable prism mirror in the present invention which is to be substituted for the prism illustrated in Figure 3.
Figure 7:
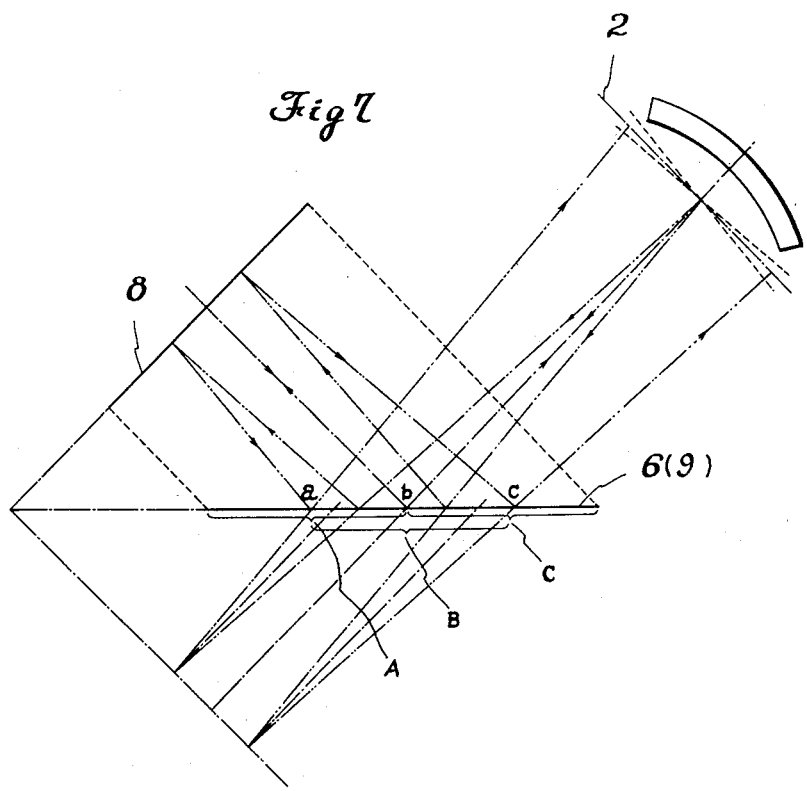
Figure 7 is a diagram for explaining the function of said prism mirror.
Figure 8:
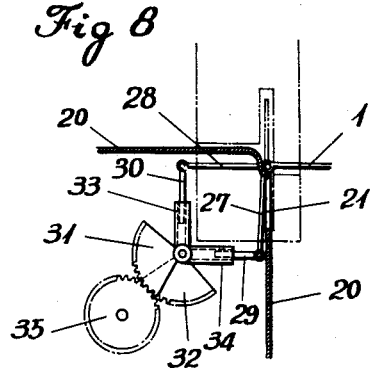
Figure 8 is a sectional view on the chain line 8—8 in Figures 1 and 2.
Figure 9:
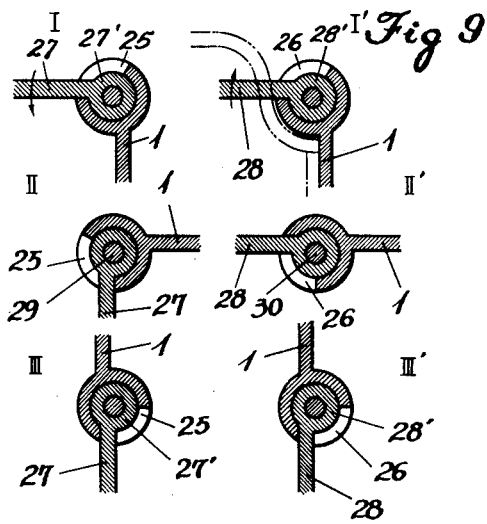
Figure 9 shows vertical sectional views of the tubular parts of both of the lid of the exposure meter and the connecting rod operatively connected with said lid to show the relation between them.

The present invention is an improvement of such camera operatively connected with an exposure meter as is mentioned above. In a conventional camera of this type, as shown in Figure 2, a hinge 1 is attached to the light receiving window of the exposure meter and a slit 1' is made in the cover so that light may be received in the photo-cell through said slit with the cover closed when the brightness of the object is high, the cover may be opened by about 90° for the medium brightness and the effect of the booster may be added for the low brightness. However, with only the above described received light adjusting device provided in the exposure meter of said camera operatively connected with the exposure meter, no proper exposure can be indicated. Therefore, in the present invention, the rotatable prism mirror 18 as is shown in Figure 6 is substituted for the fixed prism mirror 5 in Figure 3 so that the amount of movement of the image of the needle pointer of the exposure meter may continuously indicate the intensity of the brightness of the object over a wide range by properly operatively connecting the opening or closing of the cover of the exposure meter, the addition in the booster and the rotation of said prism mirror. The prism mirror shown in Figure 6 is rotatable around the horizontal axis 19. One of the reflecting mirror surfaces is parallel to the rotating axis and the other two mirror surfaces have different angles of inclination to the rotating axis or different directions of inclination. The horizontal thick line in Figure 7 represents the mirror surface of the sliding mirror 6 or 9 in Figure 3. The thick line inclining by 45 degrees to said horizontal line represents the fixed roof-shaped reflecting mirror 8 shown in Figure 3. As evident from the drawing, when the reflecting surface of the prism mirror is converted to be in three manners, the image of the needle pointer should occupy the positions of $a$, $b$ and $c$ on the mirror surface 9. Therefore, the displacement bands A, B and C of the image of the needle pointer whose middle positions are respectively said three points will partly overlap with one another. In other words, the positions of the image of the needle pointer when the lid of the exposure meter is closed, when it is opened and further when the booster is added will be linearly continuous and will represent the intensity of the brightness of the object. Thus, the above mentioned object can be attained over a wide range of brightness.

The operatively connecting mechanism to rotate the prism mirror 18 by 120 degrees at one time in response to the opening and closing of the lid 1 of the exposure meter and to the addition of the booster may be of any type. The type in Figures 8 to 11 has the following mechanism.

Figure 10:
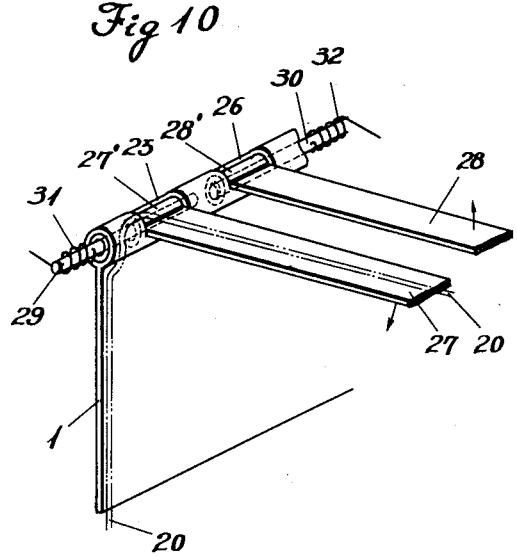
Figure 10 is a magnified perspective view of a part of Figure 8.
Figure 11:
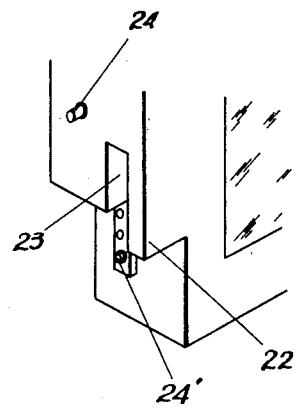
Figure 11 is a magnified perspective view showing an attaching device on the side part of the booster.

A light receiving window 21 is provided in the front wall of the box body 20 of the exposure meter. A lid 1 is hinged along the upper edge of said window 21 so as to be opened by approximately 90 degrees like a visor as illustrated and further by 90 degrees upward. When the lid is not opened by 180 degrees upward, the stepped part 22 on the side surface of the booster will contact the lid and the booster can not be inserted (see Figure 11) but, when lid is opened by 180 degrees, the groove 23 provided on the side surface of the booster will fit the lid as shown by the dotted lines in Figure 8 and the booster can be fitted. If the construction is so made that, in fitting the booster as shown in Figure 11, when the plug 24 resiliently projecting on the side surface of the booster is pushed, the lower projecting plug 24' may simultaneously retreat, said projecting plug 24'' will extend into the mortise of the exposure meter due to the resiliency of the spring and the booster will be locked. Figure 10 shows the mechanism of fitting the lid 1 by making the box body 20 of the exposure meter transparent for convenience sake. The upper edge of this lid is made tubular but is provided with two parts 25 and 26 in each of which the wall of the tube is cut off for about 90 degrees. The tubes 27' and 28' formed at the base ends of arm rods 27 and 28, respectively, are inserted in said cut parts so as to be concentric with the tubular parts of the lid 1. Those tubes 27' and 28' are fixed by proper means to shaft rods 29 and 30 loosely inserted through the tube ends of the lid 1. Coiled springs 31 and 32 are wound around said shaft rods 29 and 30, respectively. Each coiled spring is secured at one end to its shaft and is properly fixed at the other end to the box 20 of the exposure meter so as to give the arm rods 28 and 27 tendency to rotate in the direction indicated by the arrows. Therefore, in the state shown in Figure 10, when the lock of the lid 1 is released, the arm rod 27 will rotate in the direction indicated by the arrow and the fitting base 27' of the rod body will push the edge of the cut part 25 of the tube of the lid 1 and tend to open the lid. The other arm rod 28 is pressed against the inside surface of the top wall of the box body of the exposure meter. The free end of each of these arm rods 27 and 28 is fixed to one end of each of the connecting rods 29 and 30, respectively. The other end parts of said connecting rods are loosely inserted in sleeves 33 and 34 integral with the hubs of two sector gears 31 and 32, respectively, loosely fitted on a common shaft. These two sector gears are in mesh with a common gear 35 whose shaft is operatively connected with the shaft 19 of the prism mirror 18.

The construction being as described above, now, supposing that the lid 1 of the exposure meter is closed (as in I and I' in Figure 9), first of all, if the lock of the lid is released, the arm rod 27 will operate due to the resiliency of the spring 31. At the same time, the cut edge of the tubular part of the lid will be pushed by the fitting base of the arm rod and therefore the lid will be opened like a visor. That is to say, the lid will be in the state shown in II and II' in Figure 9. However, in such case, the arm rod 28 will not be influenced by the rotation of the tubular part of the lid. When the arm rod 27 falls, the connecting rod 29 will rotate the sleeve 34 and sector gear 31 while coming in and out in the longitudinal direction within the sleeve 34. Therefore, the gear 35 will be also rotated and the shaft 19 of the prism mirror will be rotated by 120 degrees. Then, when the lid is further opened by 90 degrees upward, the edge part of the cut part 26 of the lid will push the fitting base of the arm rod 28, the arm rod will be pushed down against the resiliency of the spring 30 and the lid will be in the state shown in III and III' in Figure 9. However, in this case, the arm rod 27 will not be influenced by the rotation of the tubular part of the lid. When the arm rod 28 falls, the gear 35 will be rotated through the connecting rod 30, sleeve 33 and sector gear 32 and therefore the prism mirror 18 will be further rotated by 120 degrees. When the lid is closed, the above mentioned action will be reversed and the arm rods 27 and 28 and the prism mirror 18 will return to the original states.

According to the present invention, even in case the cover of the light receiving window of the exposure meter built in the camera is opened or closed or the booster effect is increased or decreased in accordance with the brightness of the object, without taking anything into consideration, the camera will be able to be set under conditions for obtaining the proper exposure by making the image of the needle pointer of the exposure meter as projected within the field of vision of the view finder coincide with the standard mark within the same field of vision. It is therefore very convenient.

I claim:

1. A correcting device for a camera having a view finder and having a built in exposure meter, said device being adapted to determine the correct exposure by making the image of the needle pointer of the exposure meter coincide with a standard mark within the field of vision of the view finder through reflecting mirrors of said camera movable corresponding respectively to the exposure time and the opening of the diaphragm of the camera; comprising a rotatable prism mirror located between said needle pointer of said exposure meter and said movable mirrors, said prism mirror having mirror surfaces provided with different inclinations to its rotating axis, said axis of the prism mirror being mounted for rotation corresponding to the opening and closing of a cover for restricting the amount of light received by the exposure meter so that the effective reflecting surfaces of said prism mirror may be automatically changed.

2. A correcting device for a camera having a view finder and having a built in exposure meter, said device being adapted to determine the correct exposure by making the image of the needle pointer of the exposure meter coincide with a standard mark within the field of vision of the view finder through reflecting mirrors of said camera movable corresponding respectively to the exposure time and the opening of the diaphragm of the camera; comprising a rotatable prism mirror located between said needle pointer of the exposure meter and said movable mirrors, the mirror surfaces of said prism mirror have respectively different inclinations to its rotating axis, said axis of the prism mirror being rotatably mounted for rotation corresponding to the increase or decrease of the effect of a booster so that effective reflecting surfaces of said prism mirror may be automatically changed.

References Cited in the file of this patent

UNITED STATES PATENTS

| 2,191,414 | Sauer | Feb. 20, 1940 |
| 2,242,043 | Sanger | May 13, 1941 |
| 2,358,083 | Mihalyi | Sept. 12, 1944 |
| 2,360,256 | Mihalyi | Oct. 10, 1944 |

FOREIGN PATENTS

| 504,211 | Great Britain | Apr. 21, 1939 |